United States Patent
Yuan et al.

(10) Patent No.: US 8,792,211 B2
(45) Date of Patent: Jul. 29, 2014

(54) METHOD AND DATA STORAGE DEVICE FOR LASER FREE HEAT-ASSISTED MAGNETIC RECORDING

(75) Inventors: Zhimin Yuan, Singapore (SG); Bo Liu, Singapore (SG); Boon Hao Low, Singapore (SG); Tiejun Zhou, Singapore (SG); Siang Huei Leong, Singapore (SG); Mingsheng Zhang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/977,639

(22) PCT Filed: Dec. 31, 2010

(86) PCT No.: PCT/SG2010/000491
§ 371 (c)(1),
(2), (4) Date: Oct. 23, 2013

(87) PCT Pub. No.: WO2012/091675
PCT Pub. Date: Jul. 5, 2012

(65) Prior Publication Data
US 2014/0043712 A1 Feb. 13, 2014

(51) Int. Cl.
*G11B 5/127* (2006.01)

(52) U.S. Cl.
USPC ........................................ 360/125.3

(58) Field of Classification Search
USPC ............... 360/125.3, 125.03, 125.04, 125.17, 360/125.12, 125.16, 125.06, 125.15, 360/125.26, 125.09, 125.02, 125.31, 125.23
See application file for complete search history.

(56) References Cited

U.S. PATENT DOCUMENTS

2007/0159720 A1    7/2007  Sohn et al.
2007/0279791 A1   12/2007  Mallary
2008/0024896 A1    1/2008  Ohta et al.
2010/0157474 A1*   6/2010  Hsiao et al. ................ 360/125.3
2010/0214684 A1    8/2010  Gao et al.
2011/0205671 A1*   8/2011  Benakli et al. ................ 360/319

OTHER PUBLICATIONS

PCT International Search Report for PCT Counterpart Application No. PCT/SG2010/000491, 3 pgs., (Mar. 18, 2011).

(Continued)

*Primary Examiner* — Allen T Cao
(74) *Attorney, Agent, or Firm* — Blakely, Sokoloff, Taylor & Zafman LLP

(57) ABSTRACT

A data storage device with a heat assisted magnetic recording (HAMR) system, a magnetic recording medium, and method for data storage are provided. The data storage device includes a magnetic recording medium, a magnetic recording head, a power supply, a controller and a switching device. The magnetic recording head includes a main pole having a surface area facing the magnetic recording medium. The controller is coupled to the magnetic recording head for controlling writing information to and reading information from the magnetic recording medium. The switching device electrically couples the power supply between the main pole and the magnetic recording medium in response to a signal provided from the controller when writing information to the magnetic recording medium. The magnetic recording medium comprises a plurality of layers, including a heating layer, a field enhanced conduction layer, and an electrode layer. The electrode layer is electrically coupleable to the power supply and the magnetic recording head for heating a portion of the heating layer opposite the magnetic recording head during writing of data by the magnetic recording head to the magnetic recording medium, the portion of the heating layer defined by an electric field applied to the field enhanced conduction layer.

20 Claims, 13 Drawing Sheets

(56) References Cited

OTHER PUBLICATIONS

PCT Written Opinion of the International Searching Authority for PCT Counterpart Application No. PCT/SG2010/000491, 4 pgs., (Mar. 18, 2011).

PCT Notification concerning Transmittal of International Preliminary Report on Patentability (Chapter I of the Patent Cooperation Treaty) for PCT Counterpart Application No. PCT/SG2010/000491, 6 pgs., (Jul. 11, 2013).

* cited by examiner

METHOD AND DATA STORAGE DEVICE FOR LASER FREE HEAT-ASSISTED MAGNETIC RECORDING

CROSS-REFERENCE TO RELATED APPLICATIONS

This patent application is a U.S. National Phase Application under 35 U.S.C. §371 of International Application No. PCT/SG2010/000491, filed Dec. 31, 2010, entitled METHOD AND DATA STORAGE DEVICE FOR LASER FREE HEAT-ASSISTED MAGNETIC RECORDING.

FIELD OF THE INVENTION

The present invention generally relates to data storage, and more particularly relates to a method and apparatus for heat-assisted magnetic recording.

BACKGROUND OF THE DISCLOSURE

Magnetic recording in its conventional form suffers from super-paramagnetic instabilities at high bit densities. As the grain size of the magnetic recording medium is decreased in order to increase areal density, a threshold known as super-paramagnetic limit at which stable data storage is no longer feasible is reached. This threshold is dependent not only on the magnetic recording medium material, but also for a given temperature. One of the solutions to overcome this threshold is to use magnetic medium material with very high magnetic anisotropy. The medium is then softened temperately by heating during writing to temperatures at which an external write field can reverse the magnetization. This concept is known as heat-assisted magnetic recording (HAMR).

HAMR systems require spatial and temporal variations of the heat profile to be managed. In particular, lateral heat diffusion in HAMR media is an important requirement for confining the heated region in the media to desired dimensions. Typical HAMR systems utilize a heat producing means external to the magnetic recording medium. For example, many solutions involve activating a laser mounted on or near the recording head and focused on the magnetic recording medium. The laser is then activated to heat up a heating spot in the magnetic recording medium near and facing the recording head. However, heating efficiency and the heating spot size are key challenges in traditional HAMR systems which require a lot of energy for the laser light during HAMR-system writing. Much of the laser's energy is lost in the laser source to waveguide coupling, the laser light transmission through the near field transducer (NFT), and the light coupling through the gap between the head and the magnetic recording medium. In addition, the heating spot size of the laser on the recording medium must be much smaller than the diffraction limit. Due to these deficiencies in present HAMR systems, currently, a fully optimized near field optical system only conveys 1-2% of the laser energy into the magnetic recording medium.

Thus, what is needed is a data storage device with a magnetic recording medium having controlled heat transfer characteristics that is both suitable to perform heat-assisted magnetic recording and utilizes a larger percentage of the energy generated for heating the magnetic recording medium within a small heating spot size. Furthermore, other desirable features and characteristics will become apparent from the subsequent detailed description and the appended claims, taken in conjunction with the accompanying drawings and this background of the disclosure.

SUMMARY OF THE INVENTION

According to the Detailed Description, a data storage device is provided. The data storage device includes a magnetic recording medium, a magnetic recording head, a power supply, a controller and a switching device. The magnetic recording head includes a main pole having a surface area facing the magnetic recording medium. The controller is coupled to the magnetic recording head for controlling writing information to and reading information from the magnetic recording medium. The switching device electrically couples the power supply between the main pole and the magnetic recording medium in response to a signal provided from the controller when the controller is controlling writing information to the magnetic recording medium. The magnetic recording medium comprises a plurality of layers. At least a first layer of the plurality of layers includes a heating layer, a second layer of the plurality of layers includes a field enhanced conduction layer, and a third layer of the plurality of layers includes an electrode layer. The electrode layer is electrically coupleable to the power supply and the magnetic recording head for heating a portion of the heating layer facing the magnetic recording head during writing of data by the magnetic recording head to the magnetic recording medium.

In addition, a magnetic recording medium is provided. The magnetic recording medium includes a plurality of layers. At least a first layer of the plurality of layers includes a heating layer, a second layer of the plurality of layers includes a field enhanced conduction layer, and a third layer of the plurality of layers includes an electrode layer. The electrode layer is electrically coupleable through a power supply to a magnetic recording head for heating a portion of the heating layer facing the magnetic recording head during writing of data by the magnetic recording head to the magnetic recording medium.

Further, a method in a data storage device for heat assisted magnetic recording (HAMR) by internally heating a portion of a recording medium opposite a surface of a main pole of a magnetic recording head during writing of data by the magnetic recording head to the magnetic recording medium is provided. The magnetic recording medium includes a plurality of layers wherein at least a first layer includes a heating layer, a second layer includes a field enhanced conduction layer, and a third layer includes an electrode layer. The method includes the step of electrically coupling a power supply between the electrode layer of the magnetic recording medium and the main pole of the magnetic recording head when writing data to the magnetic recording medium.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of embodiments of the present invention.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description of the invention.

A data storage device in accordance with the present embodiment incorporates a heat assisted magnetic recording (HAMR) system which includes a magnetic recording medium and a magnetic recording head. The magnetic recording medium as described hereinbelow includes additional layer(s) utilizable as a field enhanced conduction layer with a significant resistivity drop under application of an electric field. During the writing process, the proper strength of an applied electric field creates a localized current window at the field enhanced conduction layer(s) in the recording medium for implementing the HAMR writing.

Figure 1A:
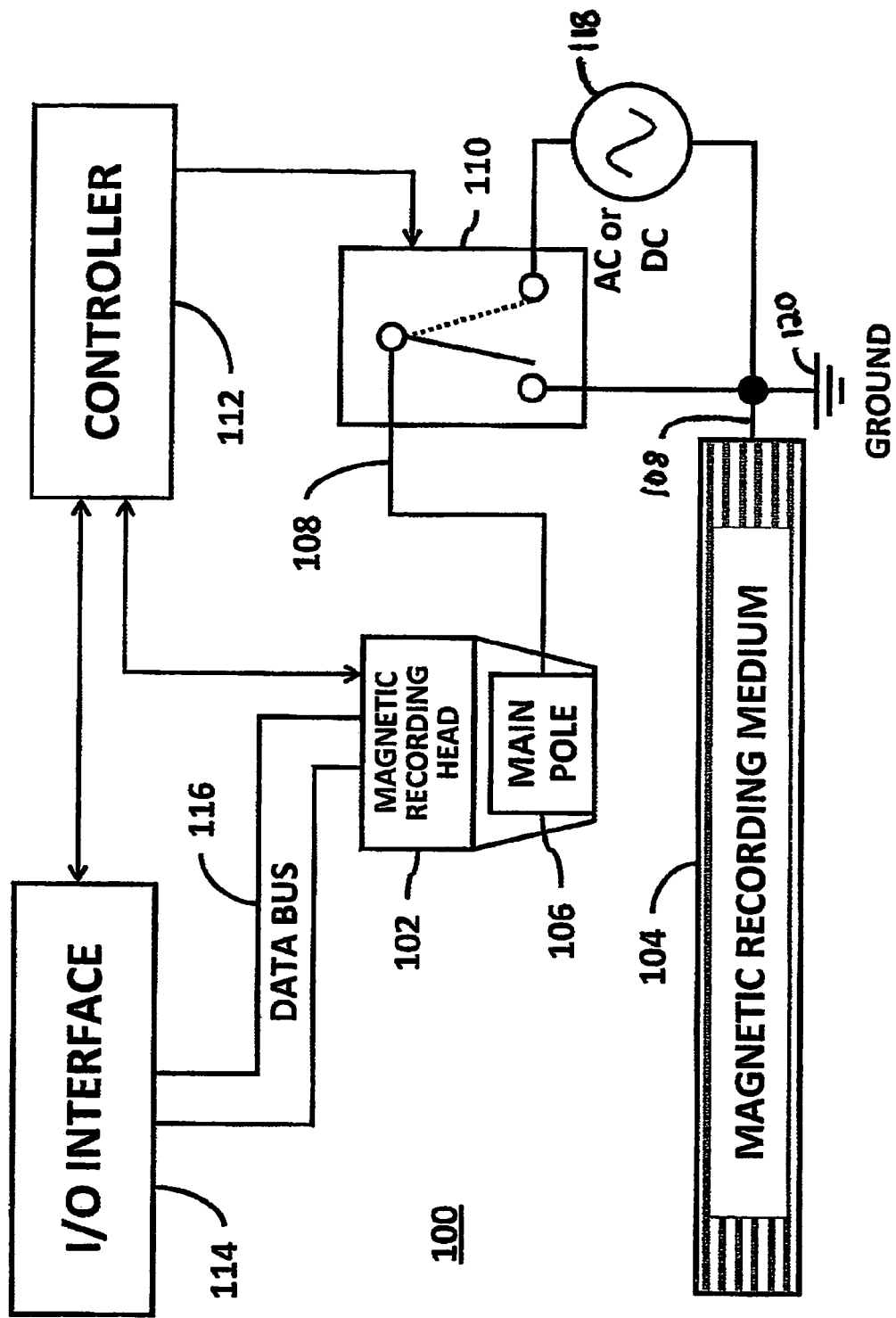
FIG. 1A is a data storage device including a heat assisted magnetic recording (HAMR) system in accordance with a present embodiment.

Referring to FIG. 1A, a data storage device 100, including a heat assisted magnetic recording (HAMR) system in accordance with a present embodiment is depicted. The data storage device 100 includes a magnetic recording head 102 and a magnetic recording medium 104. The magnetic recording head 102 includes a main pole 106 which is coupleable to the magnetic recording medium 104 by a direct current (DC) or alternating current (AC) line 108 which allows selective coupling via a switching device 110. While either DC or AC current may be used, AC current is preferred.

The switching device 110 operates under control of a signal from a controller 112. An input/output (I/O) interface 114 also operates under control of the controller 112 to provide data from the I/O interface 114 to the magnetic recording head 102 via a data bus 116 and vice versa. In accordance with the present embodiment, the controller 112 electrically couples the main pole 106 to the magnetic recording medium 104 through an AC or DC power source 118 during writing to the magnetic recording medium 104 by signaling the switching device 110. With electric connection of the main pole 106 through the power source 118 to the magnetic recording medium 104, a heating layer(s) sandwiched within the magnetic recording medium 104 provides heat for the HAMR writing of the data storage device 100 due to the electric potential difference between the main pole 106 and the magnetic recording medium 104. In a similar manner, the controller 112 signals the switching device 110 to directly connect the main pole 106 and the magnetic recording medium 104 to ground 120 during reading and verification operations and when no operations are being performed, thereby the main pole 106 and the magnetic recording medium 104 are both at the potential of the ground 120 when not writing to the magnetic recording medium 104.

Figure 1B:
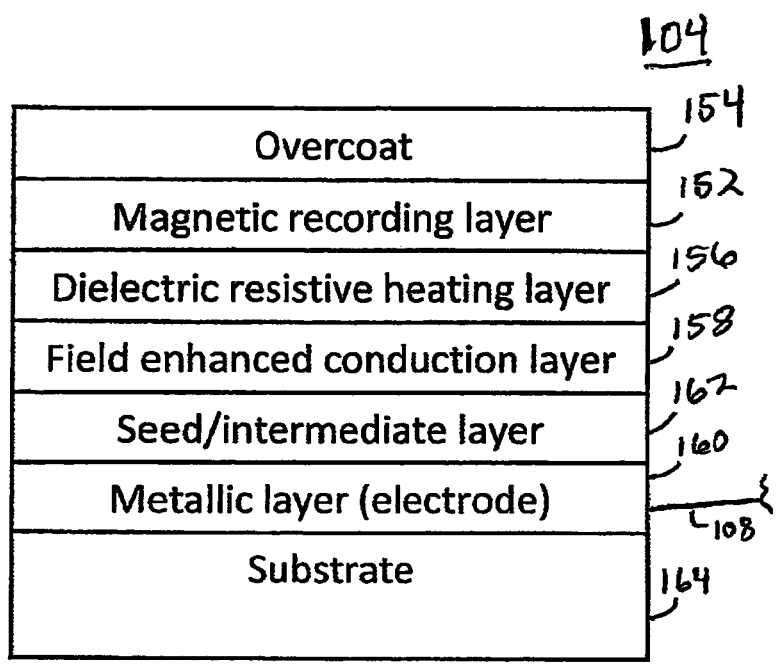
FIG. 1B is a recording medium for use in the data storage device of FIG. 1A in accordance with the present embodiment.

Referring to FIG. 1B, the magnetic recording medium 104 for use in the HAMR system 100 (FIG. 1A) in accordance with the present embodiment includes multiple layers. A magnetic recording layer 152 has an overcoat 154 formed thereon for protection thereof. In accordance with the present embodiment, heating layers, including a dielectric resistive heating layer 156 and a field enhanced conduction layer 158, are formed under the magnetic recording layer 152 to provide heat for the heat-assisted recording of the HAMR system 100. The dielectric heating layer 156 is heated by applying a current to a metallic layer (an electrode 160) via the AC line 108 to apply an electric field in a Joule heating area defined by a face of the main pole 106 of the magnetic recording head 102 (FIG. 1A) to create a localized current window within the dielectric resistive heating layer 156 for implementing the HAMR writing. The field enhanced conduction layer 158 confines the Joule heating area within the area defined by the main pole 106.

A seed/intermediate layer 162 between the electrode 160 (the metallic layer) and the field enhanced conduction layer 158 permits conduction of the current for application of the electric field to the dielectric resistive heating layer 156. Normally, the resistivity of thin film layers (such as the magnetic recording layer 152) remains constant under different electric biases or electric fields. In accordance with the present embodiment, a significant resistivity drop is created under application of an electric field. Therefore, the electric field biased area defined by the main pole 106 and the field enhanced conduction layer 158 can form a high current path through the magnetic recording layer 152 and the dielectric resistive heating layer 156 and create a localized heating area within the dielectric resistive heating layer 156 for thermally assisted magnetic writing within the magnetic recording layer 152.

The layers of the magnetic recording medium 104 includes a substrate 164 underneath the electrode 160 for providing support for the magnetic recording medium. Alternately, the conductivity of the substrate 164 can be utilized to reduce the thickness of the magnetic recording medium or increase the conductivity of the electrode 160 by a portion of the substrate 164 serving as at least a portion of the electrode 160. In a similar manner, at least a portion of the seed/intermediate layer 162 can serve as at least a portion of the electrode 160.

In accordance with the present embodiment, the dielectric resistive layer 156 is comprised of a dielectric compound such as MgO, BaTiO3, PbTiO3, SrTiO3, TiO2, or TiN. Further, in accordance with the present embodiment, a separate metallic layer serving as the electrode 160 is formed of a conductive metal such as Ag, Ta, Cu, Gd, or Pd, while the seed/intermediate layer 162 is formed of a material such as MgO, CrRu, CrMo, Ta, RuAl, or RuSi and the field enhanced conduction layer 158 is formed of a material such as InSnO3 or TiO2 or any other material which has a resistivity which drops under the influence of an electric field.

Figure 2:
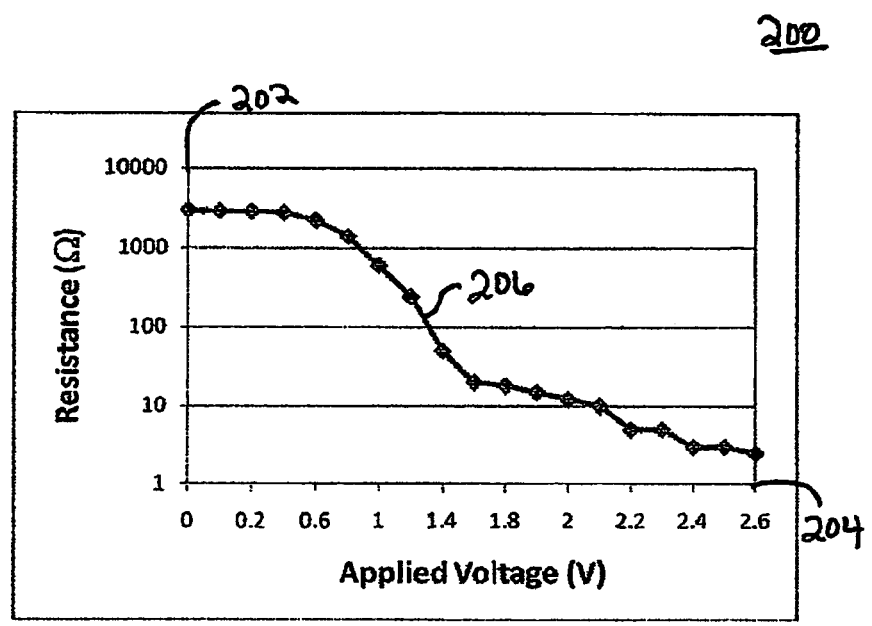
FIG. 2 is a graph of resistance change of a field enhanced conduction layer of the recording medium of FIG. 1B in response to changes in voltage of the data storage device of FIG. 1A in accordance with the present embodiment.

As described above, when the AC or DC voltage from the power source 118 is applied between the main pole 106 and the magnetic recording medium 104, an electric field is defined within the magnetic recording medium 104 and the resistance of the field enhanced conduction layer 158 drops significantly versus the electric bias. Referring to FIG. 2, a graph 200 depicts resistance change of the field enhanced conduction layer 158 on the y-axis 202 in response to changes in DC voltage on the x-axis 204 in accordance with the present embodiment. As can be seen on line 206, the resistivity can drop by three orders as the DC voltage is increased to around 2.5V. The resistance value of the magnetic recording medium 104 depends on the area of the face of the main pole 106 facing the magnetic recording medium 104 (FIG. 1A). A large main pole 106 has a lower resistance value and, consequently, when the switching device 110 is closed during writing to the magnetic recording medium 104 the current only flows through the main pole 106 to an area of the magnetic recording medium 104 opposite the main pole 106.

Figure 3:
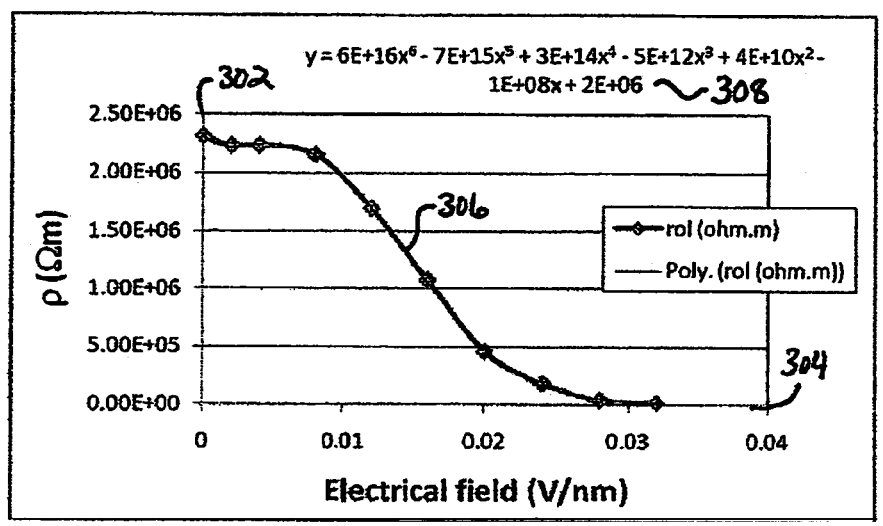
FIG. 3 is a graph of resistivity vs. electric field of the data storage device of FIG. 1A in accordance with the present embodiment.
Figure 4:
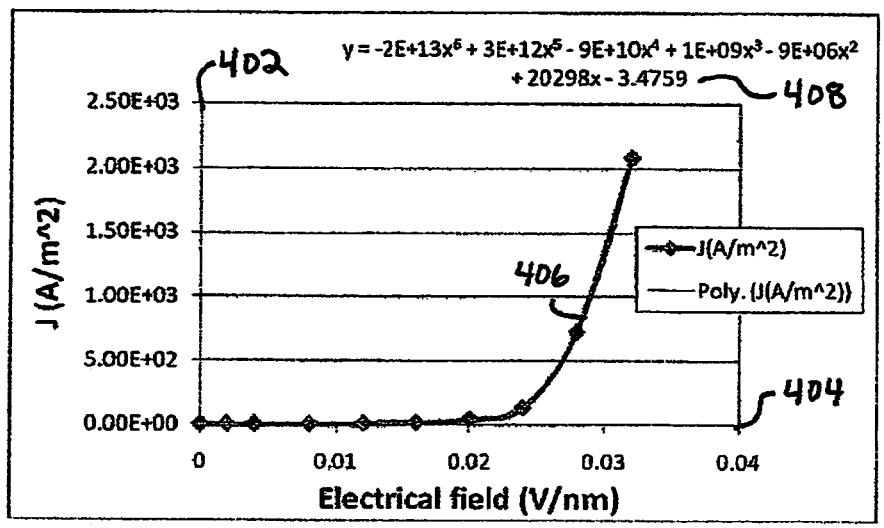
FIG. 4 is a graph of current density vs. electric field of the data storage device of FIG. 1A in accordance with the present embodiment.

In order to simulate the layers of an actual magnetic recording medium 104, the voltage on the magnetic recording medium 104 in a simulation is converted into the electric field value. FIG. 3 is a graph 300 of resistivity (on y-axis 302) vs. electric field (on x-axis 304) of the HAMR system 100 in accordance with the present embodiment, and FIG. 4 is a graph 400 of current density (on y-axis 402) vs. electric field (on x-axis 404) of the HAMR system 100. Based on the measured resistance value and the current value, FIGS. 3 and 4 show the resistivity change (on curve 306) and the current density change (on curve 406) versus the electric field. The fitting equation 308 of curve 306 is shown in FIG. 3 and the fitting equation 408 of the curve 406 is shown in FIG. 4. The equations are used to calculate the heating power by the following expression:

$$P_{heating} = I^2 R = (JA)^2 \left(\rho \frac{t}{A}\right) = (J^2 \rho t)A \qquad (1)$$

where, J is the current density, ρ is the resistive of the dielectric heating layer 156, t is the thickness of the dielectric heating layer 156, and A is the area of the dielectric heating layer 156.

Figure 5:
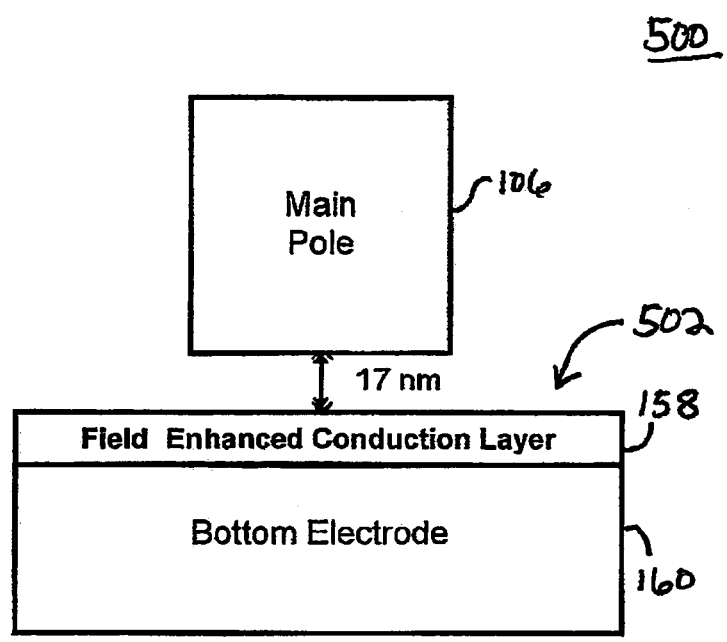
FIG. 5 is a diagram of a recording head media structure utilized for electric field and heating power calculations in accordance with the present embodiment.

FIG. 5 depicts a HAMR system 500 showing the main pole 106 located having a surface area facing a simplified magnetic recording medium 502 including the field enhanced conduction layer 158 and a bottom electrode (the metallic layer 160). Except for the field enhanced conduction layer 158 on top of the bottom electrode 160 and the electric connection by line 108, the rest of the HAMR system 500 is substantially the same as a conventional HAMR system. The HAMR system 500 is utilized to determine electric field distributions and heater power distributions in accordance with a simulation of the present embodiment.

Figure 6A:
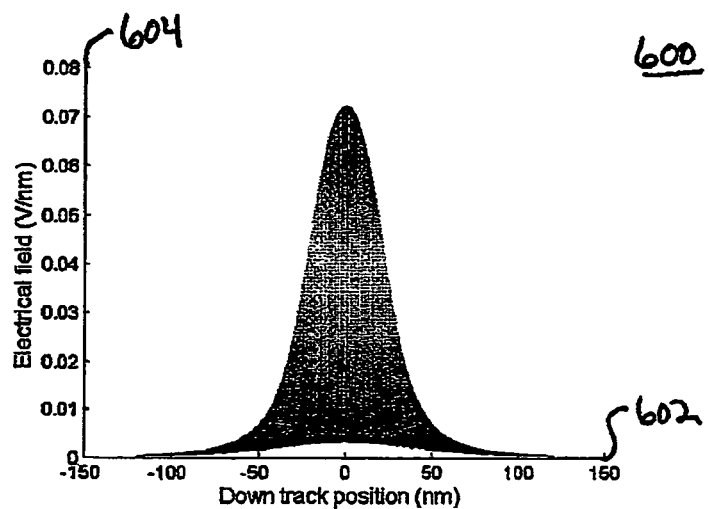
FIG. 6A is a graph of electric field distribution at the recording head in a down track direction in accordance with the present embodiment.
Figure 6B:
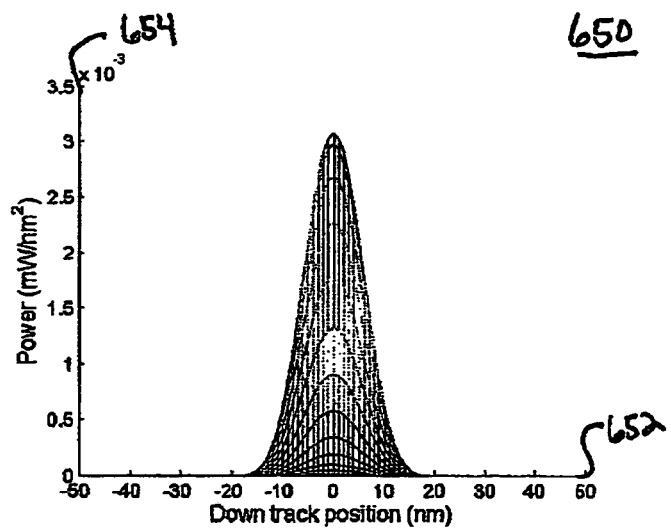
FIG. 6B is a graph of heater power distribution in response to the electric field distribution of FIG. 6A.
Figure 7A:
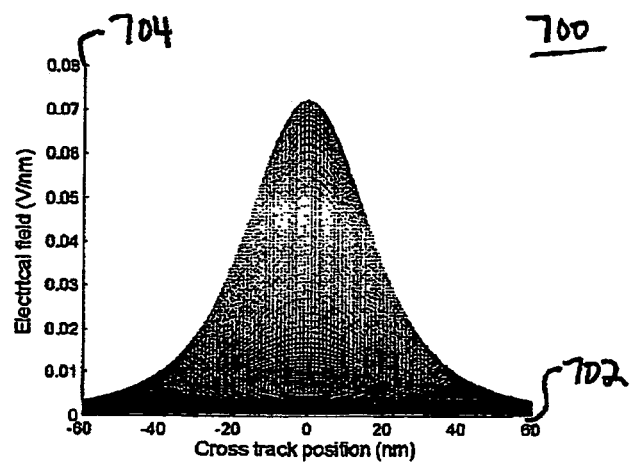
FIG. 7A is a graph of electric field distribution at the recording head in a cross track direction in accordance with the present embodiment.
Figure 7B:
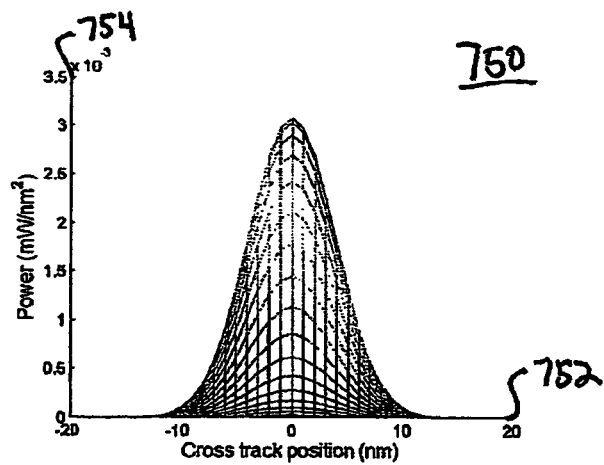
FIG. 7B is a graph of heater power distribution in response to the electric field distribution of FIG. 7A.

FIGS. 6A and 6B depict a graph 600 of electric field distribution and a graph 650 of heater power distribution, respectively, as measured in a simulation in accordance with the HAMR system 500 at the magnetic recording head 102 in a down track direction. Similarly, FIGS. 7A and 7B depict a graph 700 of electric field distribution and a graph 750 of heater power distribution; respectively, as measured in a simulation in accordance with the HAMR system 500 at the magnetic recording head 102 in a cross track direction. When the main pole 106 (having a dimension of 40 nm thick by 20 nm wide) has two volts of electric bias applied thereto (as measured in relation to the bottom electrode 160), the electric field distributions along down track direction and cross track direction are shown in FIGS. 6A and 7A, respectively, where the down track position is plotted along the x-axes 602, 702 and the electric field is plotted along the y-axis 604, 704.

By applying power equation (1) with the experimental fitting curves 308, 408, the heating power profiles along down track direction and cross track direction are shown in FIGS. 6B and 7B, respectively, where the down track position is plotted along the x-axes 652, 752 and the electric field is plotted along the y-axis 654, 754. The total power produced is of 0.416 mW concentrated in an area of 20 nm by 20 nm.

In accordance with the present embodiment, the power profile is defined by the size of the main pole 106, which can be fabricated much easier than a near field transducer (NFD) used in traditional HAMR systems. Comparing the thermal power profiles of FIGS. 6B and 7B with the electric field profiles of FIGS. 6A and 7A, the heating power profiles (FIGS. 6B and 7B) are much narrower than the respective profiles of the electric field (FIGS. 6A and 7A). In fact, the heating power profiles (FIGS. 6B and 7B) are narrower than the size of the main pole 106. Therefore, the present embodiment advantageously not only enables easier HAMR system fabrication than conventional HAMR systems, but also makes it possible for the single main pole 106 to produce both the wider profile of the magnetic field and the narrower profile of the thermal field. Simultaneously, the center of heating power produced by the main pole 106 is at the same location as the center of the magnetic field peak, thereby advantageously removing any issue of alignment between the thermal field and the magnetic field—an issue faced by traditional HAMR systems. Also, the data storage device in accordance with the present embodiment uses the strongest magnetic field under thermal profile for writing, while traditional HAMR systems are only able to use less than half of the peak magnetic field for writing. Thus, the present embodiment provides an improved recording performance during the thermal assisted writing.

Figure 8:
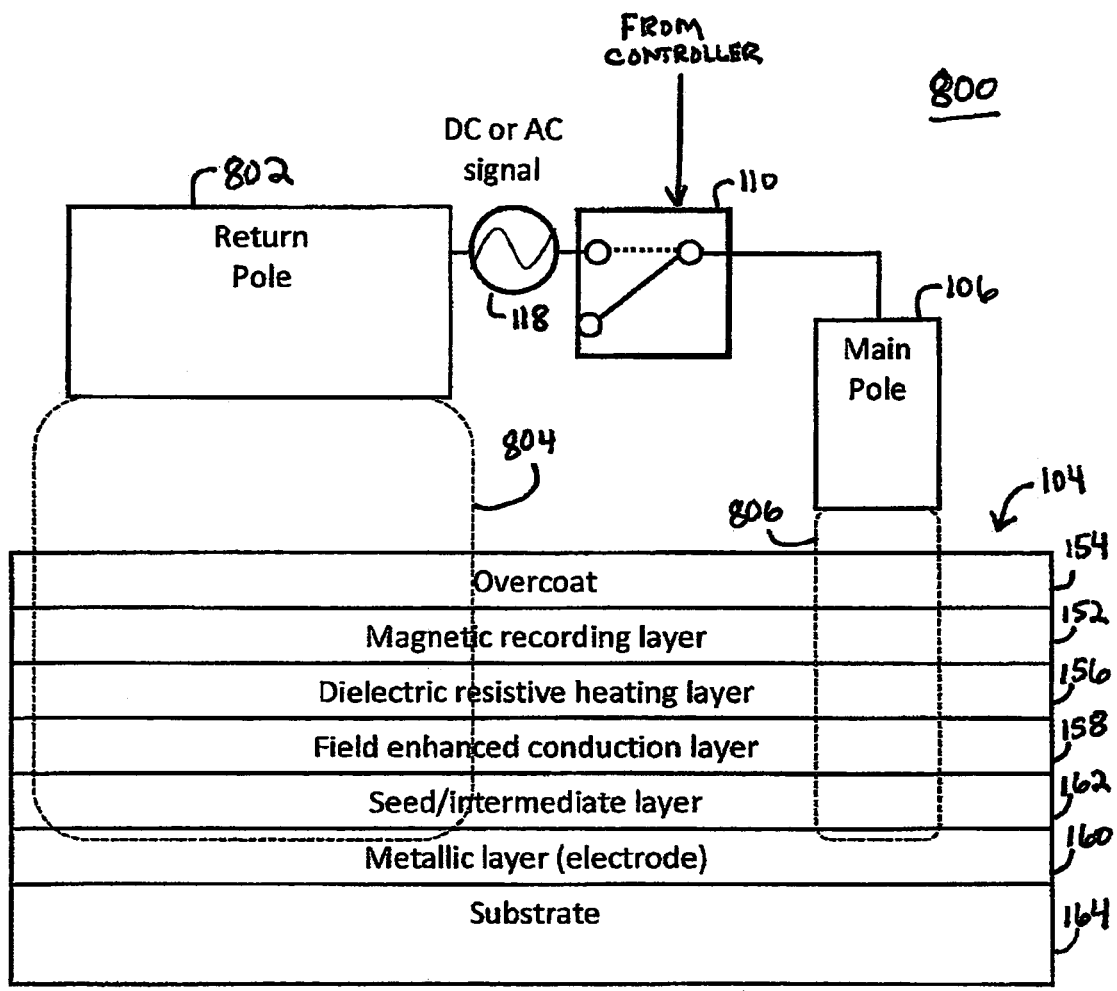
FIG. 8 is a HAMR system of a data storage device in accordance with a first alternate embodiment.

Referring next to FIG. 8, a HAMR system 800 in accordance with a first alternate embodiment is depicted. While the magnetic recording medium 104 and the magnetic recording head 102 are the same as shown in FIGS. 1A and 1B, the HAMR system 800 does not require hardwiring to the metallic layer 160. Instead, a return pole 802 located a substantial distance from the main pole 106 is provided for coupling to the metallic layer 160. The return pole 802 has a larger surface area opposite the magnetic recording medium 104 in order to hold enough electric charge at low charge density and create an electric field 804 weaker than an electric field 806 created by the main pole 106 when activated. The electric field 804 provides connection to the metallic layer 160 as shown in FIG. 8.

The main pole 106 is closer to the magnetic recording medium 104 than the return pole 802 and, therefore, can produce a stronger electric field 806. The electric field 806 also couples to the metallic layer 160, thereby closing the circuit through the metallic electrode layer 160 and providing sufficient electric field to the field enhanced conduction layer 158 and the dielectric heating layer 156 to provide the heat for heat assisted magnetic recording within the magnetic recording layer 152. When the switch 110 is closed, the electric DC or AC signal 118 is applied between the main pole 106 and the return pole 802. The separation of the main pole 106 and the return pole 802 is large enough that an applied electric potential mainly drops at the interfaces between the main and return poles 106, 802 and the metallic layer (electrode) 160 in the magnetic recording medium 104 due to the electric fields 804, 806. In addition, the return pole 802 is preferably located far from the surface of the magnetic recording medium 104 and has a weaker electric field 804 in order that the magnetic recording medium 104 opposite the return pole 802 does not significantly heat up the magnetic recording medium 104.

Figure 9:
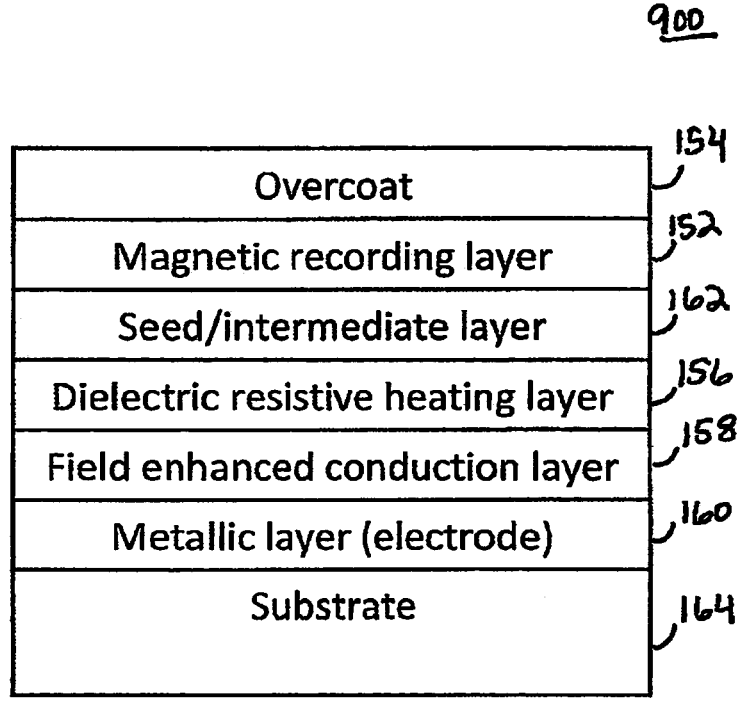
FIG. 9 is a recording medium in accordance with a second alternate embodiment.

FIG. 9 depicts a recording medium 900 in accordance with a second alternate embodiment of a HAMR system for use in the data storage device 100 (FIG. 1). In the recording medium 900, the seed/intermediate layer 162 is formed on top of the dielectric resistive heating layer 156 instead of below the field enhanced conduction layer 158 (as shown in FIG. 1B). Locating the seed/intermediate layer 162 above the dielectric resistive heating layer 156 makes it easier to fabricate the magnetic recording layer 152 in the magnetic recording medium layer structure. The heating layers (including the dielectric resistive heating layer 156 and the field enhanced conduction layer 158) are preferably formed close to the magnetic recording layer 152 for effective heating. While the heating layers are inserted between the magnetic recording layer 152 and the seed/intermediate layer 162 in the magnetic recording medium 104 (FIG. 1B), they can also be formed between the metallic layer (electrode) 160 and the seed/intermediate layer 162 in the magnetic recording medium 900 as shown in FIG. 9.

Figure 10:
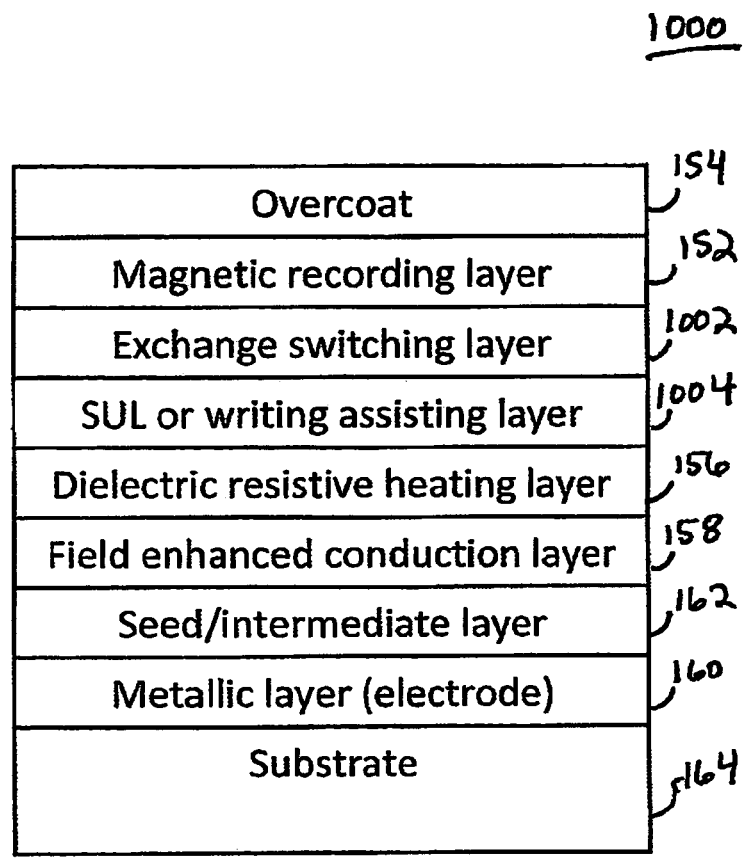
FIG. 10 is a recording medium in accordance with a third alternate embodiment.

Referring to FIG. 10, a magnetic recording medium 1000 in accordance with a third alternate embodiment of the HAMR system is depicted. The magnetic recording medium 1000 includes two additional layers, an exchange switching layer 1002 and a writing assisting layer 1004, located between the magnetic recording layer 152 and the heating layers (the dielectric heating layer 156 and the field enhanced conduction layer 158). The additional layers 1002, 1004 aid the writing of information to the magnetic recording layer 152 without sufficiently reducing the heat applied thereto. The writing assisting layer 1004 can be formed of metallic materials such as FeCo, Fe, FeNi, FeCoNi, or FeCrCo. The exchange switching layer 1002 can be formed of metallic materials such as FeRh, FePtRh, or FeIrRh and turns on the coupling of the writing assisting layer 1004 to the magnetic recording layer 152 when heated and turns off the coupling of the writing assisting layer 1004 to the magnetic recording layer 152 when cooled.

Figure 11:
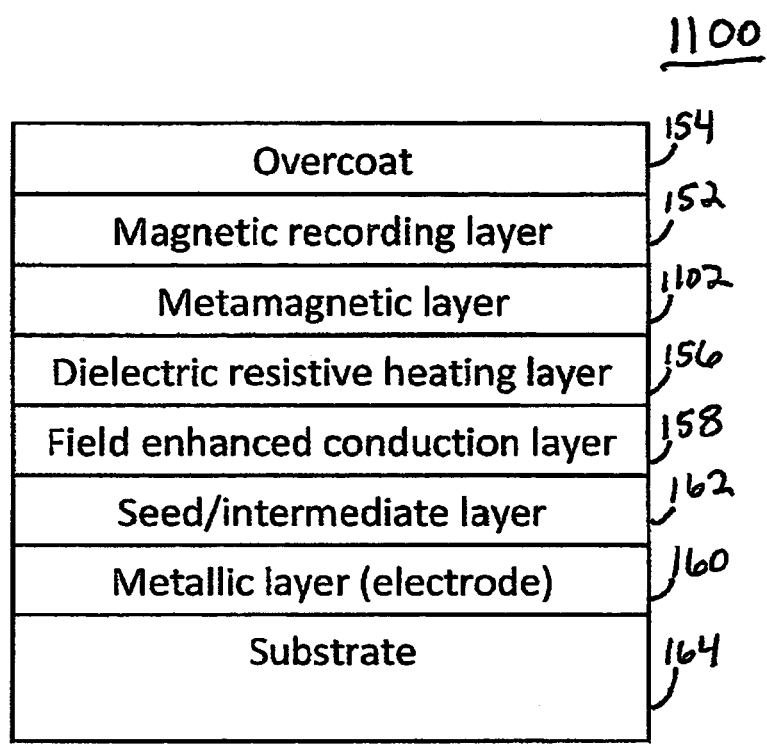
FIG. 11 is a recording medium in accordance with a fourth alternate embodiment.

Referring to FIG. 11, a magnetic recording medium 1100 in accordance with a fourth alternate embodiment of the HAMR system is depicted. The magnetic recording medium 1100 includes one additional layer, a metamagnetic layer 1102, located between the magnetic recording layer 152 and the heating layers (the dielectric heating layer 156 and the field enhanced conduction layer 158) to assist the writing of information to the magnetic recording medium 152 without sufficiently reducing the heat applied thereto. The metamagnetic layer 1102 can be formed of a metallic material such as FeRh, FePtRh, or FeIrRh. While comprised of similar materials to the exchange switching layer 1002 of FIG. 10, the metamagnetic layer 1102 is formed thicker than the exchange switching layer 1002 to serve as a writing assist layer. Once the temperature of the metamagnetic layer 1102 is heated to more than a certain temperature, i.e. two hundred degrees Centigrade, the metamagnetic layer 1102 will become magnetically soft. The coupling between magnetic recording medium 152 and the metamagnetic layer 1102, which is magnetically soft at high temperatures, will lower the switching field for heat assisted writing to the magnetic recording medium 152.

Figure 12:
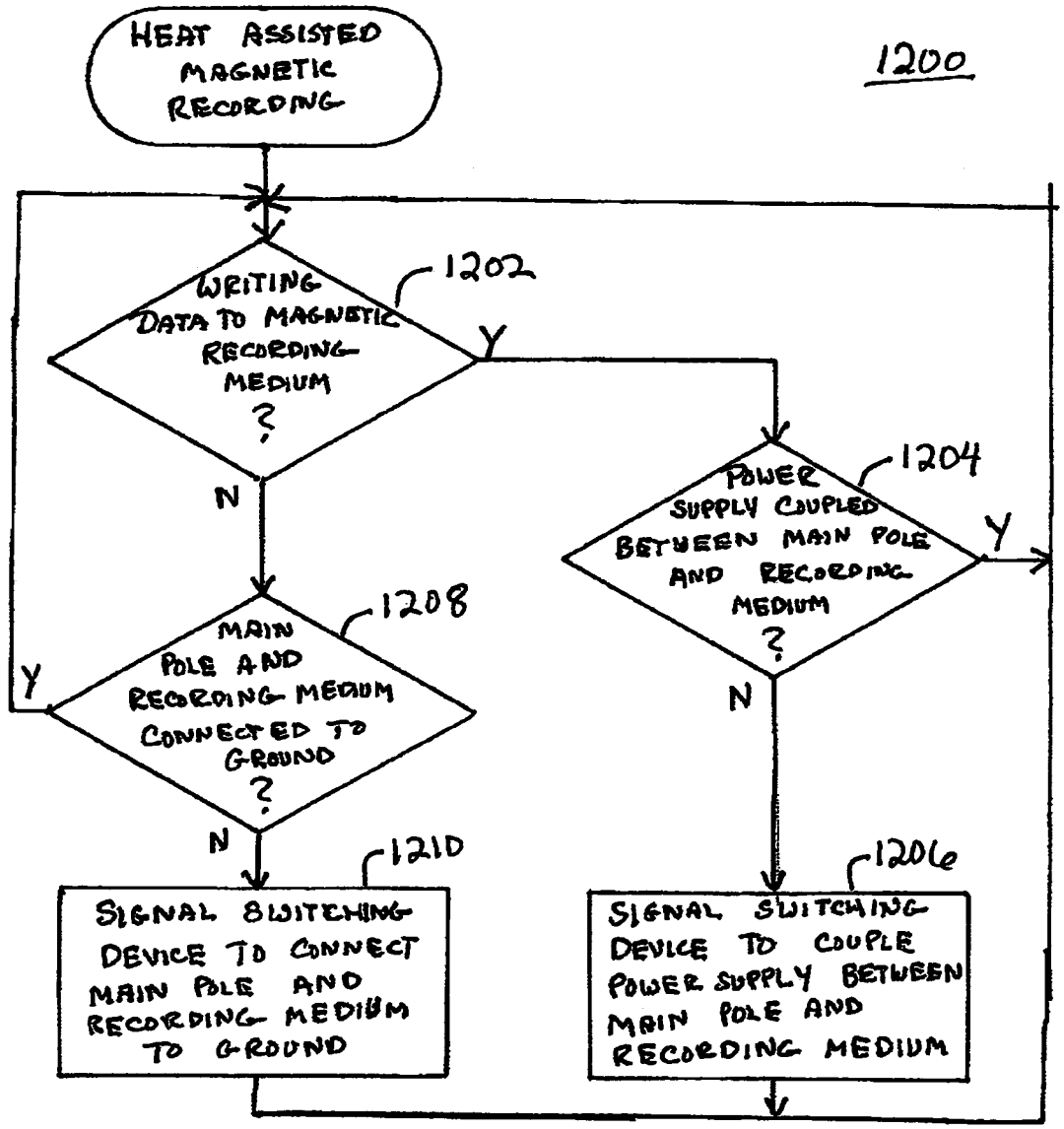
FIG. 12 is a flowchart of a method for heat assisted magnetic recording (HAMR) in accordance with the present embodiment.

Referring next to FIG. 12, a flowchart 1200 depicts a method for heat assisted magnetic recording in accordance with the present embodiment. The controller 112 controls writing information to and reading information from the magnetic recording medium 104 (FIG. 1). When the controller 112 determines 1202 that information/data is to be written to the magnetic recording medium 104, the controller 112 determines 1204 whether the power supply 118 is coupled between the main pole 106 of the magnetic recording head 102 and the magnetic recording medium 104.

If the power supply 118 is not so coupled 1204, the controller 112 generates a first signal and provides the first signal 1206 to the switching device 110 to couple the power supply 118 between the main pole 106 and the magnetic recording medium 104. When the power supply 118 is coupled 1204 between the main pole 106 and the magnetic recording medium 104, processing continues until the controller 112 determines that data is not being written 1202 to the magnetic recording medium (104) (e.g., during reading or data verification operations).

When the controller 112 determines 1202 information is not to be written to the magnetic recording medium 104, the controller 112 then determines 1208 whether both the main pole 106 and the magnetic recording medium 104 are connected to a ground potential (i.e., connected to the ground 120 (FIG. 1)). If the main pole 106 and the magnetic recording medium 106 are not both directly connected to the ground 120 as determined at step 1208, the controller 112 generates a second signal and provides 1210 the second signal to the switching device 110 to decouple the power supply 118 and directly connect the main pole 106 and the magnetic recording medium 104 to the ground 120. When the controller determines at step 1208 that the main pole 106 and the magnetic recording medium 104 are connected to the ground 120, processing continues until the controller 112 either determines that data is being written 1202 to the magnetic recording medium (104) or determines that the main pole 106 and the magnetic recording medium 104 are not both connected 1208 to ground.

In this manner, the controller 112 controls the switching device 110 to assure that the power supply 118 is coupled between the main pole 106 and the magnetic recording medium 104 when writing data to the magnetic recording medium 104 and the main pole 106 and the magnetic recording medium 104 are connected to the ground 120 when not writing data to the magnetic recording medium 104. Electrically coupling the power supply 118 between the electrode layer 160 of the magnetic recording medium 104 and the main pole 106 when writing data Ito the magnetic recording medium 104 defines an electric field applied to a portion of the field enhanced conduction layer 158 to heat a corresponding portion of the dielectric resistive heating layer 156 during the writing of data to the magnetic recording medium, both the portion of the field enhanced conduction layer 158 and the corresponding portion of the heating layer 156 are within the portion of the magnetic recording medium 104 opposite the surface of the main pole 106 facing the magnetic recording medium 104. Additionally, as described above, while the power supply 118 can either be an AC power supply or a DC power supply, the AC power supply is preferred.

Thus it can be seen that a data storage device having a HAMR system with a magnetic recording medium and a method for magnetic recording within the data storage device has been disclosed which advantageously provides controlled heat transfer characteristics that is both suitable to perform heat-assisted magnetic recording and utilizes a larger percentage of the energy generated by the main pole 106 for heating the magnetic recording medium. While several exemplary embodiments have been presented in the foregoing detailed description of the invention, it should be appreciated that a vast number of variations exist, including variations as to the materials used to form the various layers of the magnetic recording medium.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of play steps described in an exemplary embodiment without departing from the scope of the invention as set forth in the appended claims.

What is claimed is:

1. A data storage device comprising:
   a magnetic recording medium;
   a magnetic recording head comprising a main pole, wherein the main pole has a surface facing the magnetic recording medium;
   a power supply;
   a controller coupled to the magnetic recording head for controlling writing information to and reading information from the magnetic recording medium; and
   a switching device for electrically coupling the power supply between the main pole and the magnetic recording medium in response to a signal provided from the controller when the controller is controlling writing information to the magnetic recording medium,
   wherein the magnetic recording medium comprises a plurality of layers, and wherein at least a first layer of the plurality of layers comprises a heating layer, a second layer of the plurality of layers comprises a field enhanced conduction layer, and a third layer of the plurality of layers comprises an electrode layer, the electrode layer electrically coupleable to the power supply and the main pole of the magnetic recording head by the switching device for heating a portion of the heating layer opposite the magnetic recording head during writing of data by the magnetic recording head to the magnetic recording medium.

2. The data storage device in accordance with claim 1 wherein the heating layer comprises a dielectric resistive heating layer.

3. The data storage device in accordance with claim 1 wherein the electrode layer comprises one or more of a portion of a substrate layer, a seed/intermediate layer or a separate metallic layer.

4. The data storage device in accordance with claim 1 wherein the field enhanced conduction layer is located between the electrode layer and the heating layer.

5. The data storage device in accordance with claim 1 wherein the portion of the heating layer is defined by an electric field applied to the field enhanced conduction layer.

6. The data storage device in accordance with claim 1 wherein the field enhanced conduction layer has a thickness sufficient to create a low resistance portion thereof with at least one order lower resistivity per unit area than a resistance of the field enhanced conduction layer other than the low resistance portion when a zero electric field is applied to the field enhanced conduction layer.

7. The data storage device in accordance with claim 1 wherein a heating resolution of the magnetic recording medium is defined by a combination of the field enhanced conduction layer and the heating layer.

8. The data storage device in accordance with claim 1 wherein the plurality of layers of the magnetic recording medium further comprise a magnetic recording layer and one or more layers selected from the group comprising an overcoat layer, a seed/intermediate layer, a substrate layer, an exchange switching layer, a writing assisting layer, and a metamagnetic layer.

9. The data storage device in accordance with claim 1 wherein the overcoat layer is located above the magnetic recording layer, and wherein the magnetic recording layer is located above the heating layer, and wherein the heating layer is located above the field enhanced conduction layer, and wherein the field enhanced conduction layer is located above the seed/intermediate layer, and wherein the seed/intermediate layer is located above the separate metallic layer, and wherein the separate metallic layer is located above the substrate layer.

10. The data storage device in accordance with claim 9 wherein the exchange switching layer is located below the magnetic recording layer, and wherein the writing assisting layer is located below the exchange switching layer and above the heating layer.

11. The data storage device in accordance with claim 8 wherein the metamagnetic layer is located below the recording medium layer and above the heating layer.

12. The data storage device in accordance with claim 8 wherein the overcoat layer is located above the magnetic recording layer, and wherein the magnetic recording layer is located above the seed/intermediate layer, and wherein the seed/intermediate layer is located above the heating layer, and wherein the heating layer is located above the field enhanced conduction layer, and wherein the field enhanced conduction layer is located above the separate metallic layer, and wherein the separate metallic layer is located above the substrate layer.

13. The data storage device in accordance with claim 1 wherein the switching device electrically connects the electrode layer of the magnetic recording medium to the main pole of the magnetic recording head when writing data to the magnetic recording medium to define an electric field applied to a portion of the field enhanced conduction layer of the magnetic recording medium to heat the portion of the heating layer of the magnetic recording medium opposite the magnetic recording head during the writing data to the magnetic recording medium.

14. The data storage device in accordance with claim 1 further comprising a return pole having a surface area facing the magnetic recording medium, wherein the electrode layer is electrically coupleable through the return pole and the switching device to the main pole of the magnetic recording head for heating a portion of the heating layer opposite the main pole of the magnetic recording head during writing of data by the magnetic recording head to the magnetic recording medium.

15. The data storage device in accordance with claim 1 wherein the switching device electrically couples the electrode layer of the magnetic recording medium to the main pole of the magnetic recording head by alternating current in response to the signal provided from the controller when the magnetic recording head is writing data to the magnetic recording medium.

16. The data storage device in accordance with claim 1 wherein the switching device electrically connects the electrode layer of the magnetic recording medium to the main pole of the magnetic recording head by direct current in response to the signal provided from the controller when the magnetic recording head is writing data to the magnetic recording medium.

17. A magnetic recording medium comprising a plurality of layers, wherein at least a first layer of the plurality of layers comprises a heating layer, a second layer of the plurality of layers comprises a field enhanced conduction layer, and a third layer of the plurality of layers comprises an electrode layer, the electrode layer electrically coupleable to a magnetic recording head via a power supply for heating a portion of the heating layer opposite the magnetic recording head during writing of data by the magnetic recording head to the magnetic recording medium.

18. A method in a data storage device for heat assisted magnetic recording (HAMR) by internally heating a portion of a magnetic recording medium opposite a surface of a main pole of a magnetic recording head during writing of data by the magnetic recording head to the magnetic recording medium, the magnetic recording medium comprising a plurality of layers wherein at least a first layer of the plurality of layers comprises a heating layer, a second layer of the plurality of layers comprises a field enhanced conduction layer, and a third layer of the plurality of layers comprises an electrode layer, the method comprising the step of electrically coupling a power supply between the electrode layer of the magnetic recording medium and the main pole of the magnetic recording head when writing data to the magnetic recording medium.

19. The method in accordance with claim 18 wherein the step of electrically coupling the power supply between the electrode layer of the magnetic recording medium and the main pole of the magnetic recording head comprises the step of electrically coupling an alternating current (AC) power supply between the electrode layer of the magnetic recording medium and the main pole of the magnetic recording head when writing data to the magnetic recording medium.

20. The method in accordance with claim 18 wherein the step of wherein the step of electrically coupling the power supply between the electrode layer of the magnetic recording medium and the main pole of the magnetic recording head comprises the step of electrically coupling a direct current (DC) power supply between the electrode layer of the magnetic recording medium and the main pole of the magnetic recording head when writing data to the magnetic recording medium.

* * * * *